US 6,700,595 B2

(12) United States Patent
Sugiyama et al.

(10) Patent No.: US 6,700,595 B2
(45) Date of Patent: Mar. 2, 2004

(54) IMAGE FORMING APPARATUS WITH ACCURATE IMAGE FORMATION

(75) Inventors: Toshihiro Sugiyama, Tokyo (JP); Hiroshi Ishii, Zushi (JP); Hiroshi Saitoh, Ichikawa (JP); Yuji Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 111 days.

(21) Appl. No.: 10/101,978

(22) Filed: Mar. 21, 2002

(65) Prior Publication Data

US 2002/0135656 A1 Sep. 26, 2002

(30) Foreign Application Priority Data

Mar. 21, 2001 (JP) ........................ 2001-080713

(51) Int. Cl.[7] ................ B41J 2/385; B41J 2/435; G03G 13/04; G03G 15/043; G01D 15/14
(52) U.S. Cl. .................. 347/133; 347/233; 399/49; 399/51; 399/72
(58) Field of Search ................ 347/133, 132, 347/129, 236, 246; 399/49, 72, 51

(56) References Cited

U.S. PATENT DOCUMENTS

| 4,965,634 A | * 10/1990 | Bando |
| 5,198,852 A | * 3/1993 | Mikami |
| 5,805,192 A | * 9/1998 | Sasaki et al. ............. 347/133 |
| 6,081,348 A | 6/2000 | Budnik et al. |

FOREIGN PATENT DOCUMENTS

| JP | 09-197776 | 7/1997 |
| JP | 10-181091 | 7/1998 |
| JP | 11-34389 | * 2/1999 |

OTHER PUBLICATIONS

U.S. Patent application Ser. No. 10/101,978, Sugiyama et al., filed Mar. 21, 2002.
U.S. Patent application Ser. No. 10/418,111, Kawahara et al., filed Apr. 18, 2003.

* cited by examiner

*Primary Examiner*—Susan S. Y. Lee
(74) *Attorney, Agent, or Firm*—Oblon, Spivak, McClelland, Maier & Neustadt, P.C.

(57) ABSTRACT

An image forming apparatus includes an image bearing member, a latent image writing device that emits a plurality of laser beams, two adjacent laser beams of the plurality of laser beams partially overlapping in a sub-scanning direction, respectively, and forming a reference latent image on a surface of the image bearing member by performing repeated scanning of each laser beam on the surface of the image bearing member, a developing device that develops the reference latent image with toner into a reference toner image, and a detecting device that detects the density of the reference toner image. The quantity of light of each laser beam forming a subsequent latent image is adjusted according to the density of the reference toner image detected by the detecting device.

12 Claims, 11 Drawing Sheets

FIG. 5C
THIRD MODE

FIG. 5D
FOURTH MODE

FIG. 10A
FIRST MODE

FIG. 10B
SECOND MODE

FIG. 10C
THIRD MODE

FIG. 10F
SIXTH MODE

FIG. 10G
SEVENTH MODE

FIG. 10H
EIGHTH MODE

FIG. 11

IMAGE FORMING APPARATUS WITH ACCURATE IMAGE FORMATION

BACKGROUND OF THE INVENTION

1. Field of the Invention

The present invention relates to an electrophotographic image forming apparatus such as a digital copying machine, a laser beam printer, a laser beam plotter, a facsimile machine, etc.

2. Discussion of the Background

In an electrophotographic image forming apparatus such as a digital copying machine, a laser beam printer, a laser beam plotter, a facsimile machine, etc., an image is formed by at least the following processes. First, a surface of an image bearing member such as a photoreceptor is scanned by a laser beam according to image data, and thereby a latent image is formed on the image bearing member. The latent image is developed with toner stored in a developing device. Subsequently, a toner image is transferred onto a transfer material such as a recording sheet. Thereafter, an unfixed toner image is fixed onto the transfer material.

A background image forming apparatus described in Japanese Laid-open patent publication No. 9-197776 has an objective of performing image forming processes with accuracy regardless of differences between apparatuses and environmental conditions. In order to achieve this objective, in an image forming apparatus employing an overlapped scanning exposure method, a plurality of exposure patterns are formed on a photoreceptor to be developed with toner into toner images. An average toner density measuring device measures the average toner density of each toner image. A relationship between a quantity of light of each laser beam forming the exposure patterns and an image edge position is obtained from the measured average toner density, and is stored in a memory of an adjusting device. The image forming processes are performed with accuracy regardless of differences between apparatus and environments by controlling the quantity of light of each laser beam based on the relationship between the quantity of light of each laser beam forming the exposure patterns and the image edge position.

Another background image forming apparatus described in Japanese Laid-open patent publication No. 10-181091 has an objective of precisely forming images having twice the resolution of an image writing device including an optical scanning system. In order to achieve this objective, the image forming apparatus includes an image data source that supplies image data having a resolution twice that of an optical scanning device. An image pattern judging device judges the pattern in a sub-scanning direction of the image data input from the image data source. An exposure control device outputs a laser beam lighting signal and a laser beam intensity signal for reproducing the image data according to the image data by an optical scanning device having a resolving power half that of the image data. A modulation exposure device modulates the laser beam based on the laser beam lighting signal and laser beam intensity signal from the exposure control device, and a photoreceptor is scanned by the laser beam modulated by the modulation exposure device.

When a latent image writing device, including an optical scanning system or a plurality of optical scanning systems, emits a plurality of laser beams, and when images are formed at twice the resolution of the latent image writing device, the following conditions (1)–(2) are required to precisely form images. (1) A density of a toner image formed by any one of the plurality of laser beams should be equal each other. (2) A density of a toner image formed by any two adjacent partially overlapped such beams should be equal to that of each toner image formed by any one of the plurality of laser beams.

Generally, a quantity of light of each laser beam forming latent images on an image bearing member and an image writing time are preset for an image forming apparatus. However, the density of toner images varies between apparatuses, depending on environmental conditions and the lapse of time. Therefore, in order to accurately reproduce images according to image data input to the image forming apparatus, the quantity of light of each laser beam is desired to be adequately adjusted.

SUMMARY OF THE INVENTION

According to one aspect of the present invention, an image forming apparatus includes an image bearing member, and a latent image writing device a mechanism to emit a plurality of laser beams, two adjacent of the plurality of laser beams partially overlapping in a sub-scanning direction, respectively, and a latent image writing device configured to emit a plurality of laser beams, and a mechanism to form a latent image of a reference image on a surface of the image bearing member by performing repeated scanning of each laser beam forming the latent image of the reference image on the surface of the image bearing member. The latent image writing device has a plurality of modes of writing the latent image of the reference image.

The image forming apparatus further includes a developing device configured to develop the latent image of the reference image formed on the surface of the image bearing member with toner into a toner image of the reference image, and a detecting device configured to detect the density of the toner image of the reference image on the image bearing member. The quantity of light of each laser beam forming a subsequent latent image is adjusted according to the density of the toner image of the reference image detected by the detecting device.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Preferred embodiments of the present invention are described in detail referring to the drawings, wherein like reference numerals designate identical or corresponding parts throughout the several views.

Figure 1:
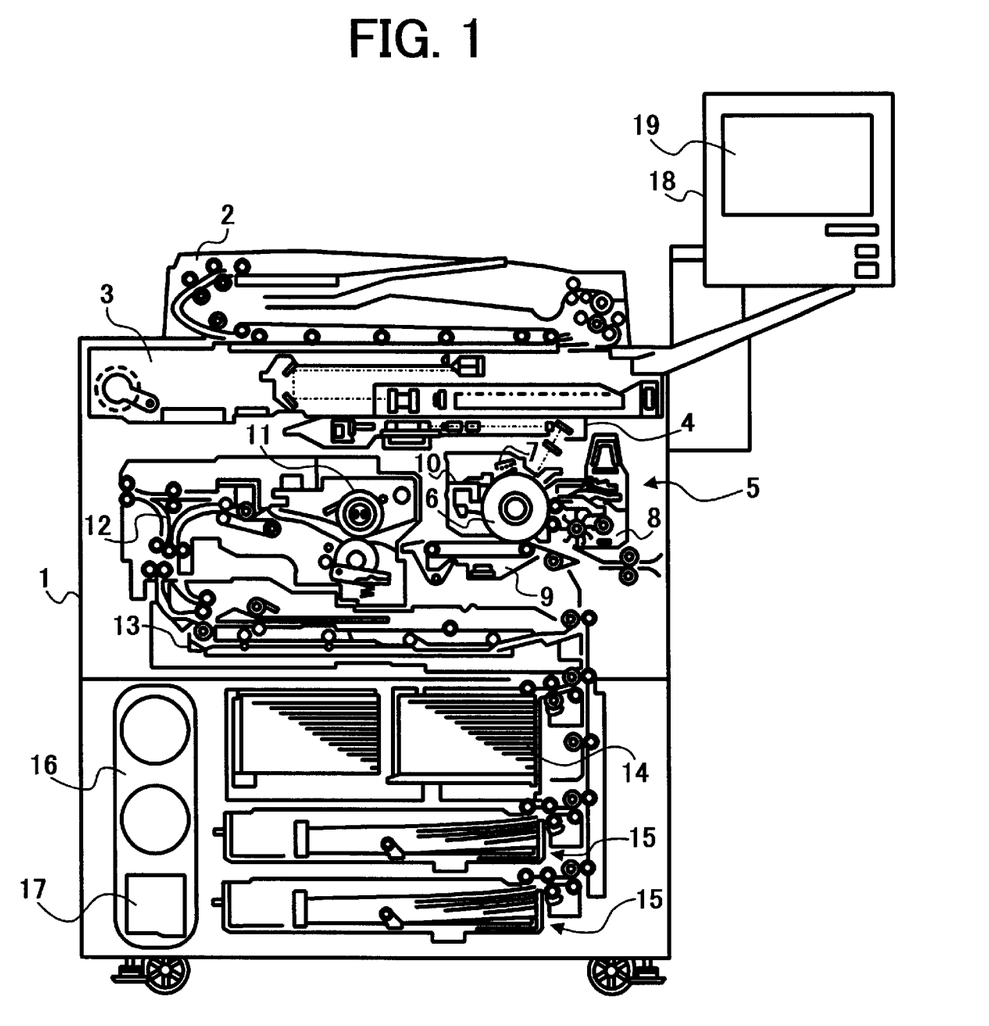
FIG. 1 is a schematic perspective view of an image forming apparatus according to an embodiment of the present invention.

FIG. 1 is a schematic view of an image forming apparatus according to an embodiment of the present invention.

Referring to FIG. 1, the image forming apparatus according to the embodiment of the present invention includes a main body 1 and an automatic document feeder (hereinafter referred to as an ADF) 2 that automatically feeds original documents. The main body 1 includes a scanner unit 3 that reads the image information of an original document fed onto a contact glass by the ADF 2, a latent image writing device 4 that writes a latent image by exposing a surface of a drum-shaped photoconductive photoreceptor 6 (hereinafter referred to as a photoreceptor drum 6) serving as an image bearing member to light beams (hereinafter referred to as laser beams) according to the image data read by the scanner unit 3, a drum unit 5 that accommodates the photoreceptor drum 6, and the photoreceptor drum 6.

Arranged around the photoreceptor drum 6 are a charging device 7 such as a corona charging device, a charging roller, a charging brush, or a solid state charging device, that charges the photoreceptor drum 6, a developing device 8 that develops a latent image formed on the photoreceptor drum 6 with toner, a transfer device 9, such as a belt-type transfer device employing a transfer belt as illustrated in FIG. 1, that transfers a toner image formed on the photoreceptor drum 6 onto a transfer material, and a cleaning device 10, employing a cleaning blade or a cleaning brush, that removes residual toner from the photoreceptor drum 6. The developing device 8 may use a one-component developer (i.e., toner) or a two-component developer (i.e., toner and carrier). The drum unit 5 accommodates the charging device 7, the developing device 8, the transfer device 9, and the cleaning device 10 in addition to the photoreceptor drum 6.

The main body 1 of the image forming apparatus further includes a fixing device 11, such as a fixing device including a heating roller and a pressure roller, that fixes a toner image transferred onto a transfer material under the influence of heat and/or pressure, a transfer material reversing/discharging device 12 that directs a transfer material carrying a fixed image to a transfer material reversing section or to a transfer material discharging section, and a transfer material reversing device 13 that reverses and refeeds a transfer material when images are respectively formed on two sides of the transfer material.

At an upper right side part of the main body 1 of FIG. 1, the main body 1 further includes an operation unit 18 with which various conditions of the image forming apparatus are set. The operation unit 18 includes an operation and display panel 19 such as a touch panel.

Below the main body 1, the image forming apparatus further includes tandem-type transfer material feeding trays 14 that store a large number of transfer materials, such as recording sheets, most frequently used and that feed the transfer materials to the transfer device 9, universal trays 15 that store transfer materials, such as recording sheets, having various kinds of sizes and that feed the transfer materials to the transfer device 9, a toner bank 16 including plural toner bottles storing toner supplied to the developing device 8, and a waste toner bottle 17 that holds waste toner removed from the photoreceptor drum 6 by the cleaning device 10.

Referring to FIG. 1, upon starting of an image forming operation, the scanner unit 3 scans an image of an original document fed by the ADF 2, and then scanned image data is sent to the latent image writing device 4. At substantially the same time, the charging device 7 uniformly charges the photoreceptor drum 6. Thereafter, the latent image writing device 4 irradiates the surface of the photoreceptor drum 6 with a laser beam according to the image data, thereby forming an electrostatic latent image on the surface of the photoreceptor drum 6.

The developing device 8 develops the electrostatic latent image on the surface of the photoreceptor drum 6 with toner to form a visible image (i.e., a toner image). The toner image on the photoreceptor drum 6 is transferred onto a transfer material such as a recording sheet by the transfer device 9. The transfer material carrying an unfixed toner image is conveyed to the fixing device 11. Thereafter, the fixing device 11 fixes the toner image onto the transfer material.

The image forming apparatus of FIG. 1 further includes a photosensor 100 serving as a detecting device (not shown in FIG. 1 but shown in FIG. 6) in the drum unit 5 at the downstream side of the developing device 8 with respect to the rotating direction of the photoreceptor drum 6. The photosensor 100 is configured to detect an optical reflection density of a toner image of a reference image formed by any one of a plurality of laser beams or any two adjacent partially overlapped of such laser beams.

Figure 2:
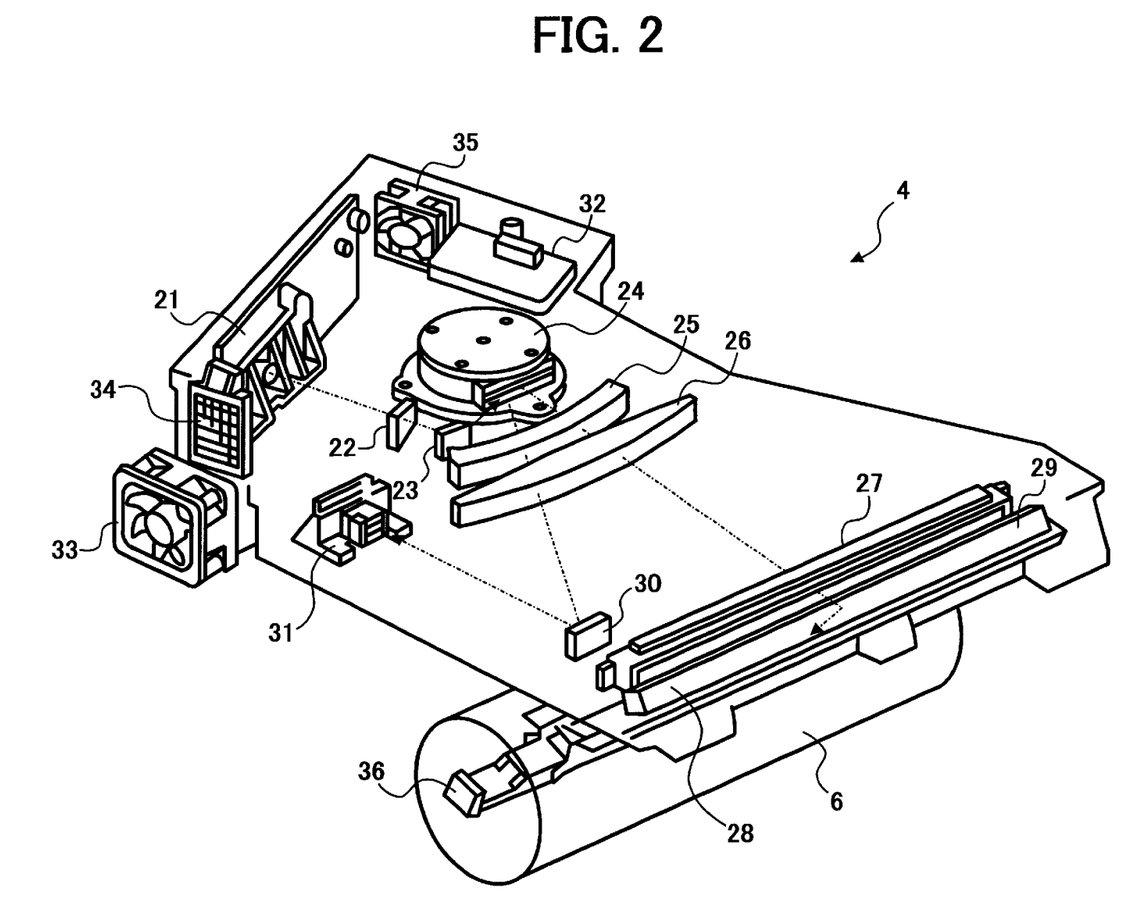
FIG. 2 is a schematic perspective view of a main construction of a latent image writing device of the image forming apparatus of FIG. 1.

FIG. 2 is a schematic perspective view of a main construction of the latent image writing device 4 of the image forming apparatus of FIG. 1. The latent image writing device 4 is configured to form a latent image on a surface of the photoreceptor drum 6 by use of an optical scanning system that deflects and scans a laser beam with a light deflector 24.

The latent image writing device 4 includes a laser diode unit 21 (hereinafter referred to as an LD unit 21) that uses a laser diode (LD) as a light source of a laser beam, a cylindrical lens 22 that converges a laser beam emitted from the LD unit 21 in a sub-scanning direction, a first mirror 23 that reflects the laser beam having passed through the cylindrical lens 22, and the light deflector 24 including a polygonal mirror that deflects and reflects the laser beam, and a motor (not shown) that drives the polygonal mirror to rotate.

The latent image writing device 4 further includes a first fθ lens 25 and a second fθ lens 26 that converge a laser beam deflected by the light deflector 24 to form an image on the surface of the photoreceptor drum 6, a barreled toroidal lens 27 for correcting curvature of field and aberration, a second mirror 28 and a third mirror 29 that reflect the laser beam having passed through the barreled toroidal lens 27, a synchronization detection mirror 30, a synchronization detection sensor 31, a motor driver 32 that controls the motor (not shown), an air intake fan 33 for cooling, a dustproof filter 34, an air exhaust fan 35, and a dustproof glass 36.

Figure 3:
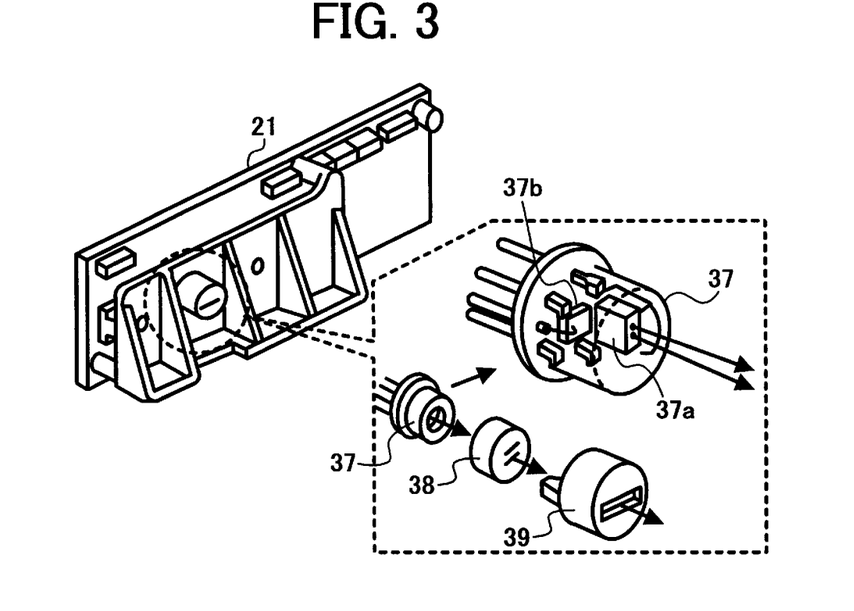
FIG. 3 is a schematic view of a construction of a laser diode unit of the latent image writing device of FIG. 2.

FIG. 3 is a schematic view of a construction of the LD unit 21 of the latent image writing device 4 of FIG. 2. The LD unit 21 includes a laser diode (LD) light source part 37, a collimator lens 38, and an aperture 39. The LD light source part 37 accommodates a two-channel laser diode array 37a (hereinafter referred to as an LD array 37a) constructed of two laser emitting elements (hereinafter referred to as LD1, LD2), and a photodiode 37b for detecting a quantity of light of a laser beam. The LD array 37a emits two laser beams.

Figure 4:
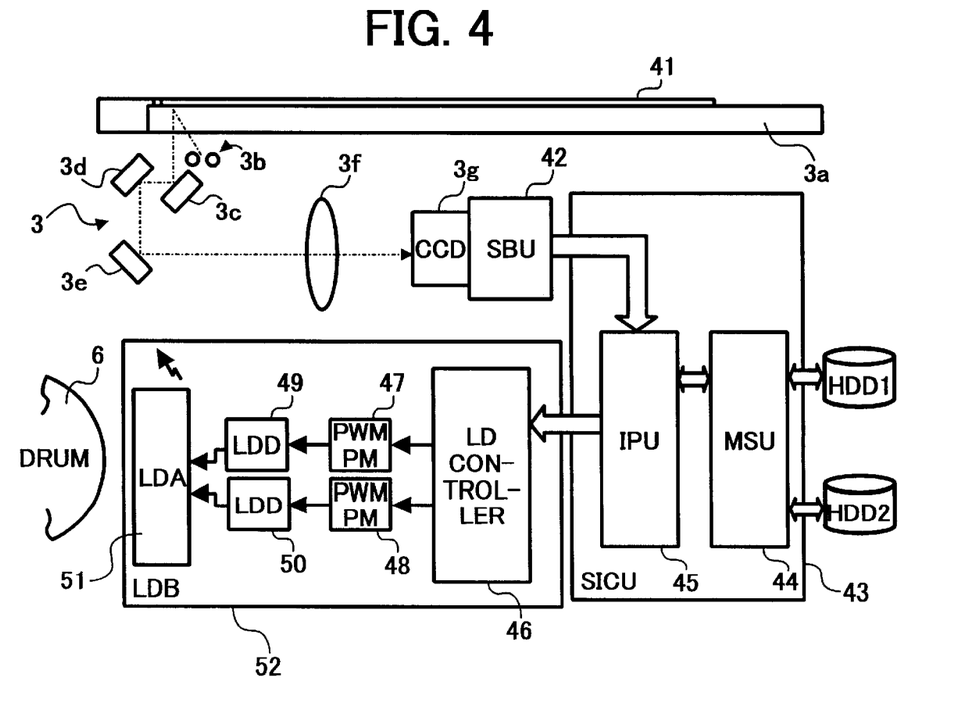
FIG. 4 is a block diagram illustrating a control system that controls image processing and driving of a laser array of the laser diode unit of FIG. 3 according to the embodiment of the present invention.

FIG. 4 is a block diagram illustrating a control system that controls image processing and driving of the LD array 37a according to the embodiment of the present invention.

Referring to FIG. 4, the scanner unit 3 includes a contact glass 3a on which an original document 41 is set, a light source 3b, mirrors 3c through 3e, an imaging lens 3f, and a charge-coupled device 3g (hereinafter referred to as a CCD 3g).

Specifically, the original document 41 on the contact glass 3a is exposed to a light emitted from the light source 3b. The light reflected from the original document 41 is imaged on the CCD 3g through the mirrors 3c to 3e and the imaging lens 3f. The CCD 3g performs photoelectric conversion and outputs a signal. The signal output from the CCD 3g is amplified and subjected to analog/digital conversion by a sensor board unit 42 (hereinafter referred to as a SBU 42), and is input as image data to a scanner and image processing control unit 43 (hereinafter referred to as a SICU 43) serving as an image system main board.

The SICU 43 includes a memory supercharger unit 44 (hereinafter referred to as a MSU 44) having the functions of image compression and decompression, and memory and HDD control, and an image processing unit 45 (hereinafter referred to as an IPU 45) that performs image processing. The SICU 43 processes the image data input from the SBU 42 and outputs the processed image data to a laser diode drive board 52 (hereinafter referred to as an LDB 52).

The LDB 52 serves as a laser diode drive board that controls the LD array 37a of the LD unit 21 illustrated in FIGS. 2 and 3. The LDB 52 includes an LD controller 46 that controls the LD array 37a driven according to the image data from the IPU 45, modulating parts 47 and 48 that perform pulse width modulation (PWM) and power modulation (PM), laser diode drives (LDD) 49 and 50 that control the LD array 37a to emit two laser beams, and a two-channel laser diode array (LDA) 51 corresponding to the LD array 37a of the LD unit 21 of FIG. 3 and including two laser beam emitting elements. In this control system, the latent image writing device 4 forms latent images on the surface of the photoreceptor drum 6 having twice the resolution of the input image data by two partially overlapped laser beams adjacent to each other, emitted from the LD array 37a (51).

In the image forming apparatus according to the embodiment of the present invention, before performing an image forming operation, each profile (e.g., quantity of light, time of writing latent images) of two laser beams for forming latent images according to image data is predetermined. However, in order to precisely form images, the quantity of light of each laser beam needs to be adjusted in an actual image formation according to the density of the toner images.

Figure 6:
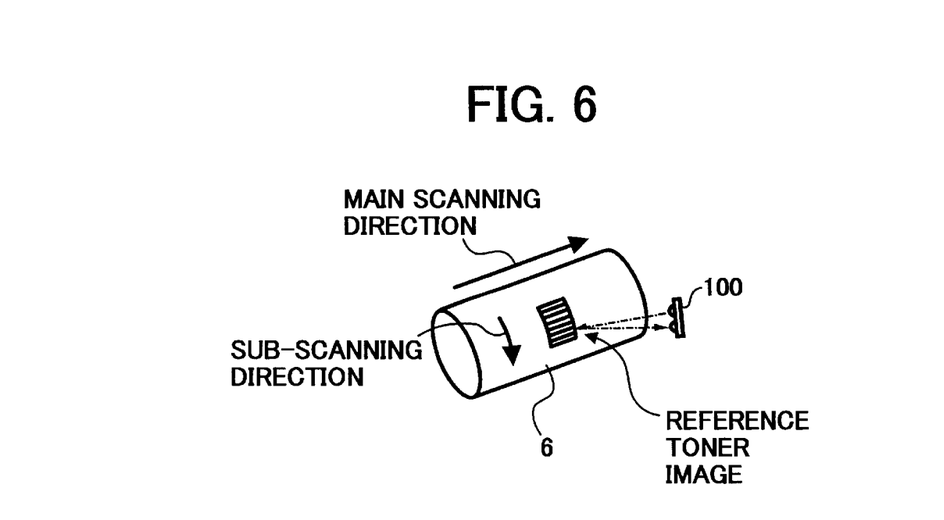
FIG. 6 is a schematic view explaining a toner image of a reference image whose density is detected by a photosensor.

Hereinafter described is how the quantity of light of each laser beam is adjusted according to the density of the toner images. As illustrated in FIG. 6, a latent image of a reference image (hereinafter simply referred to as a reference latent image) is formed on the surface of the photoreceptor drum 6 by performing repeated scanning of each laser beam, and is then developed with toner into a toner image (e.g., a halftone image) of the reference image (hereinafter simply referred to as a reference toner image). The reference toner image is formed at a position and of a size on the surface of the photoreceptor drum 6 that allows the photosensor 100 to detect the density of the reference toner image.

Figure 5A:
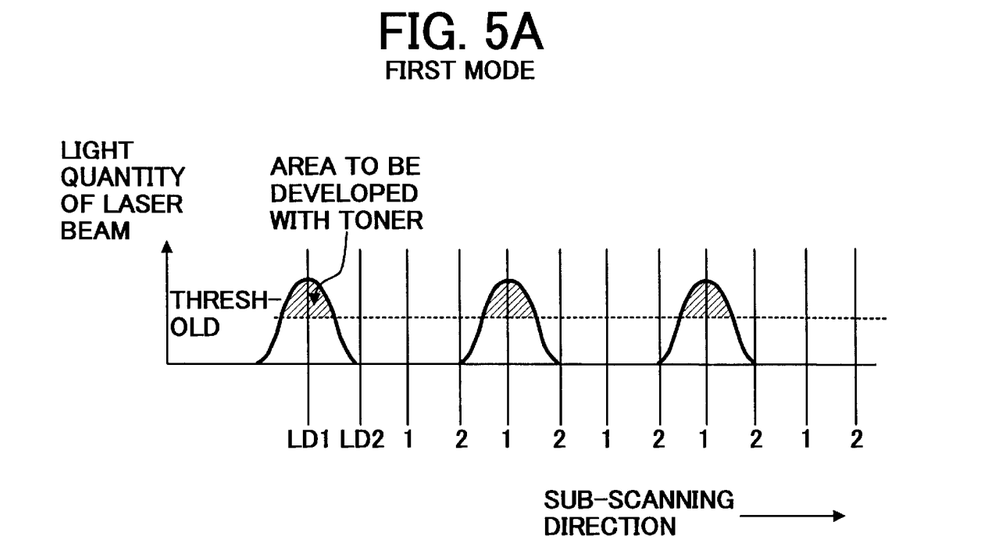
FIGS. 5A through 5D are schematic views explaining four modes of writing a latent image of a reference image according to the embodiment of the present invention.

The latent image writing device 4 has four modes of writing the reference latent image. FIGS. 5A through 5D are schematic views explaining the four modes of writing the reference latent image. In the first mode, as illustrated in FIG. 5A, the latent image writing device 4 writes a first mode reference latent image by a laser beam emitted from a first laser diode (hereinafter simply referred to as LD1) of the two-channel LD array 37a (51) on the surface of the photoreceptor drum 6.

The first mode reference latent image formed by the laser beam emitted from LD1 is developed with toner into a first mode reference toner image. Subsequently, the photosensor 100 measures the density of the first mode reference toner image. Thereafter, the quantity of light of the laser beam emitted from LD1 is adjusted by the power modulation (PM) according to the density of the first mode reference toner image detected by the photosensor 100 such that the density of the first mode reference toner image becomes an adequate value. If necessary, the quantity of light of the laser beam emitted from LD1 may be adjusted according to the density of a plurality of first mode reference toner images.

Figure 5B:
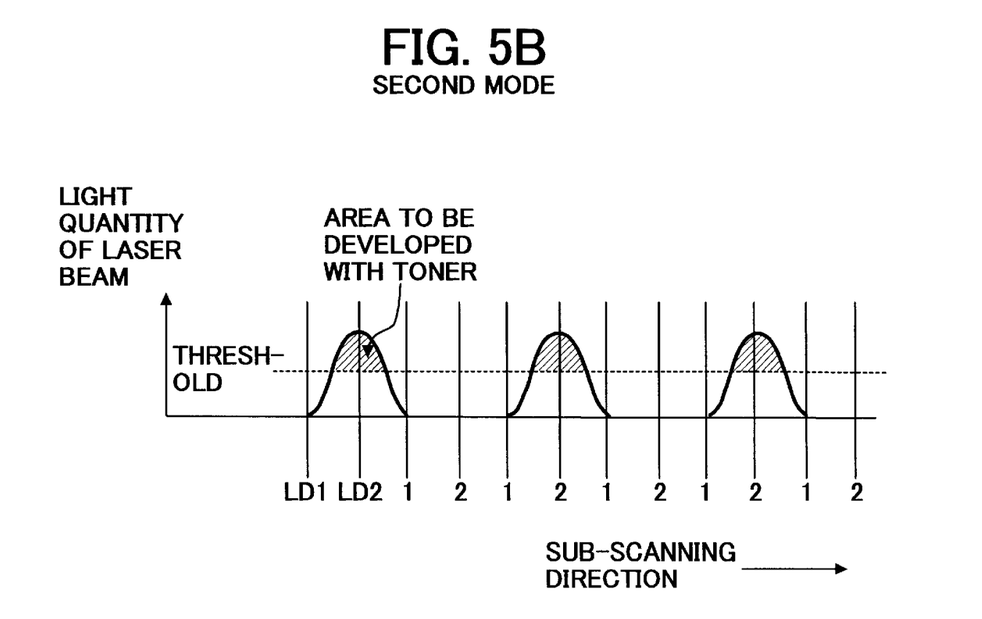

Next, in the second mode, as illustrated in FIG. 5B, the latent image writing device 4 writes a second mode reference latent image by a laser beam emitted from a second laser diode (hereinafter simply referred to as LD2) of the two-channel LD array 37a (51) on the surface of the photoreceptor drum 6. The second mode reference latent image formed by the laser beam emitted from LD2 is developed with toner into a second mode reference toner image.

Similarly as in the first mode, the photosensor 100 measures the density of the second mode reference toner image. Thereafter, the quantity of light of the laser beam emitted from LD2 is adjusted by the power modulation (PM) according to the density of the second mode reference toner image detected by the photosensor 100 such that the density of the second mode reference toner image becomes an adequate value. Thereby, the quantity of lights of laser beams emitted from LD1 and LD2 is well balanced.

Figure 5C:
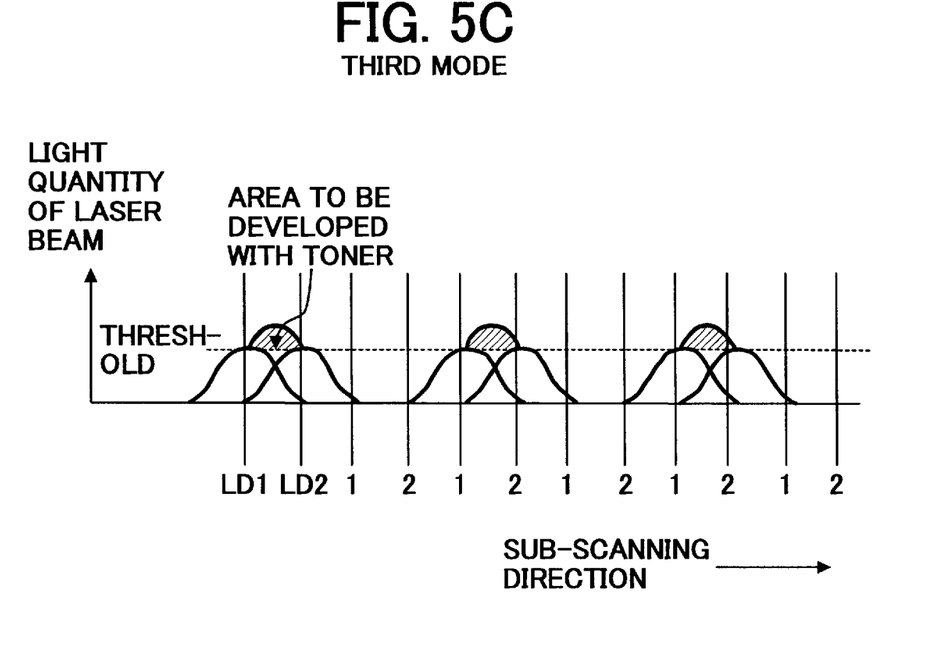

In the third mode, as illustrated in FIG. 5C, the latent image writing device 4 writes a second mode reference latent image by two adjacent partially overlapped laser beams emitted from LD1 and LD2 on the surface of the photoreceptor drum 6. The third mode reference latent image formed by the two adjacent partially overlapped laser beams emitted from LD1 and LD2 is developed with toner into a third mode reference toner image.

Similarly as in the first and second modes, the quantity of light of the two adjacent partially overlapped laser beams emitted from LD1 and LD2 is adjusted by the power modulation (PM) according to the density of the third mode reference toner image detected by the photosensor 100 such that the density of the third mode reference toner image becomes an adequate value. Thereby, the quantity of light of any one of the two laser beams emitted from LD1 and LD2, and the quantity of light of the two adjacent partially overlapped laser beams emitted from LD1 and LD2, are well balanced.

With the above-described adjustments of the laser beams in the first through third modes, precise images according to image data may be obtained in image formation even if the sensitivity and characteristics of the photoreceptor drum 6 changes or the LD array 37a deteriorates due to the lapse of time and changes in environmental conditions.

Figure 5D:
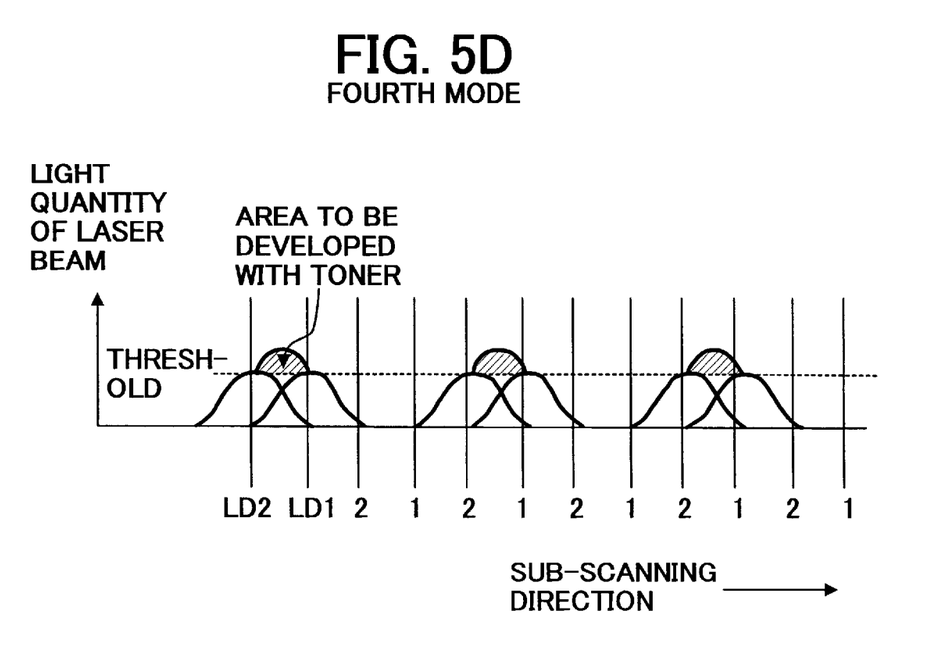
Figure 7:
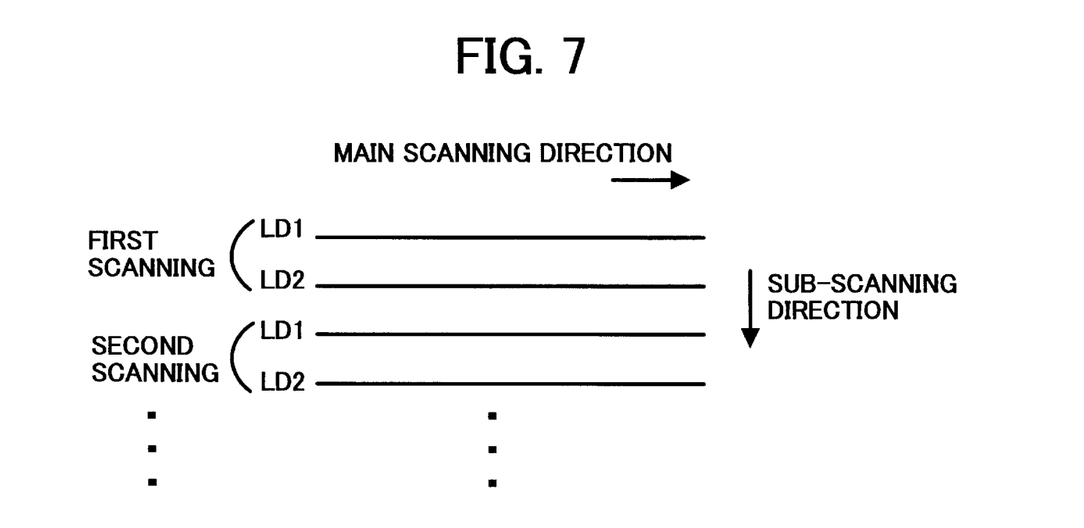
FIG. 7 is a schematic view explaining a fourth mode in which a reference latent image is formed by way of a laser beam emitted in a first scanning partially overlapped with a laser beam emitted in a second scanning.

With respect to a fourth mode in which the latent image writing device 4 writes a reference latent image by two adjacent partially overlapped laser beams on the surface of the photoreceptor drum 6, as illustrated in FIG. 5D, a fourth mode reference latent image may be formed by a laser beam emitted from LD2 partially overlapped with a laser beam emitted from LD1 (i.e., the fourth mode). Specifically, referring to FIG. 7, a fourth mode reference latent image may be formed by a laser beam emitted from LD2 in the first scanning (i.e., scanning a most downstream position on the surface of the photoreceptor drum 6 in the sub-scanning direction in a previous scan in repeated scanning), partially overlapped with a laser beam emitted from LD1 in the second scanning (i.e., scanning a most upstream position on the surface of the photoreceptor drum 6 in the sub-scanning direction in a subsequent scan in repeated scanning).

When comparing the adjusted value of the quantity of light of the laser beam in the first and second modes with that of the quantity of light of the laser beam in the third mode, a ratio between the adjusted value of the quantity of light of the laser beam in the first and second modes and that of the quantity of light of the laser beam in the third mode may be obtained. If the quantity of light of the laser beam emitted from LD2 partially overlapped with the laser beam emitted from LD1 is adjusted by the above-described ratio, adjusting the quantity of light of the laser beam by writing the reference latent image in the fourth mode is not necessarily required.

However, there may be a case in which a laser beam pitch changes. In order to obtain images with accuracy, it is preferable that the quantity of light of each laser beam is adjusted by performing the first through fourth modes.

In addition, if another reference toner image is formed by a broader or narrower laser beam, and a quantity of light of each laser beam is adjusted for image formation according to the density of another reference toner image, an image may be formed more precisely.

Next, an image forming apparatus according to another embodiment of the present invention is described. The image forming apparatus according to the another embodiment of the present invention has a construction similar to the image forming apparatus of FIG. 1 with the exception of the LD unit 21 of the latent image writing device 4. The elements of the image forming apparatus of the another embodiment having substantially the same functions as those employed in the image forming apparatus of FIG. 1 are designated with the same reference numerals and their descriptions are omitted here.

Figure 8:
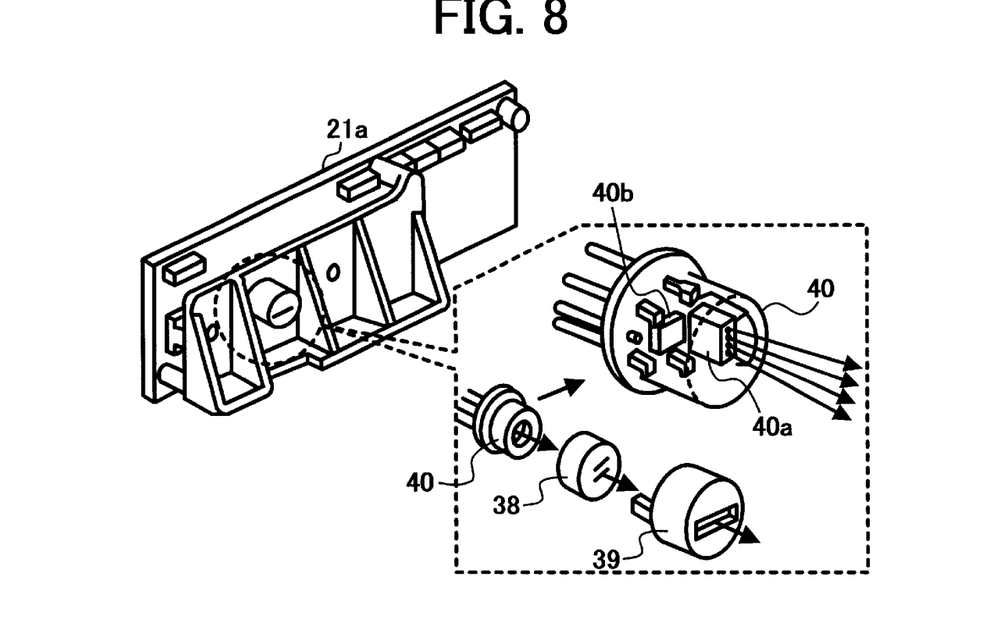
FIG. 8 is a schematic view of constructions of a laser diode unit according to another embodiment of the present invention.

FIG. 8 is a schematic view of a construction of an LD unit 21a of the latent image writing device 4. The LD unit 21a includes a laser diode (LD) light source part 40, the collimator lens 38, and the aperture 39. The LD light source part 40 accommodates a four-channel laser diode array 40a (hereinafter referred to as an LD array 40a) constructed of four laser emitting elements (hereinafter referred to as LD1, LD2, LD3, and LD4), and a photodiode 40b for detecting quantity of light of a laser beam. The LD array 40a emits four laser beams.

Figure 9:
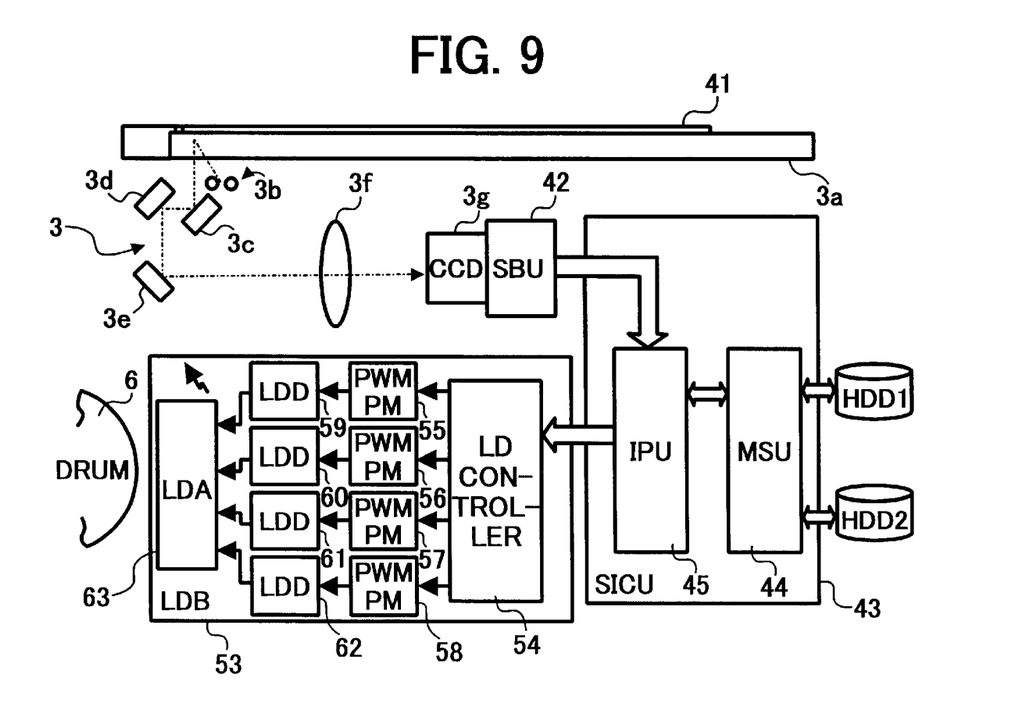
FIG. 9 is a block diagram illustrating a control system that controls image processing and driving of a laser array of the laser diode unit of FIG. 8 according to the another embodiment of the present invention.

FIG. 9 is a block diagram illustrating a control system that controls image processing and driving of the LD array 40a according to the another embodiment of the present invention.

Referring to FIG. 9, the scanner unit 3 includes the contact glass 3a on which the original document 41 is set, the light source 3b, the mirrors 3c through 3e, the imaging lens 3f, and the CCD (charge-coupled device) 3g.

Specifically, the original document 41 on the contact glass 3a is exposed to a light emitted from the light source 3b. The light reflected from the original document 41 is imaged on the CCD 3g through the mirrors 3c to 3e and the imaging lens 3f. The CCD 3g performs photoelectric conversion and outputs signals. The signals output from the CCD 3g are amplified and subjected to analog/digital conversion by the SBU (sensor board unit) 42, and are input as image data to the SICU (scanner and image processing control unit) 43 serving as an image system main board.

The SICU 43 includes the MSU (memory supercharger unit) 44 having the functions of image compression and decompression, and memory and HDD control, and the IPU (image processing unit) 45 that performs image processing. The SICU 43 processes the image data input from the SBU 42 and outputs the processed image data to a laser diode drive board 53 (hereinafter referred to as an LDB 53).

The LDB 53 serves as a laser diode drive board that controls the LD array 40a of the LD unit 21a illustrated in FIG. 8. The LDB 53 includes an LD controller 54 that controls the LD array 40a driven according to the image data from the IPU 45, modulating parts 55, 56, 57, and 58 that perform pulse width modulation (PWM) and power modulation (PM), laser diode drives (LDD) 59, 60, 61, and 62 that control the LD array 40a to emit four laser beams, and four-channel laser diode array (LDA) 63 corresponding to the LD array 40a of the LD unit 21a of FIG. 8 and including four laser beam emitting elements. In this control system, the latent image writing device 4 forms latent images on the surface of the photoreceptor drum 6 having twice the resolution of the input image data by two partially overlapped laser beams adjacent to each other, emitted from the LD array 40a (63).

In the image forming apparatus according to the another embodiment of the present invention, before performing an image forming operation, each profile (e.g., quantity of light, time of writing latent images) of four laser beams for forming latent images according to image data is predetermined. However, in order to precisely form images, the quantity of light of each laser beam needs to be adjusted in an actual image formation according to the density of the toner images.

Hereinafter described is how the quantity of light of each laser beam is adjusted according to the density of the toner images. Similarly as in FIG. 6, a reference latent image is formed on the surface of the photoreceptor drum 6 by performing repeated scanning of each laser beam, and is then developed with toner into a reference toner image (e.g., a halftone image). The reference toner image is formed at a position and of a size on the surface of the photoreceptor drum 6 that allows the photosensor 100 to detect the density of the reference toner image.

Figure 10A:
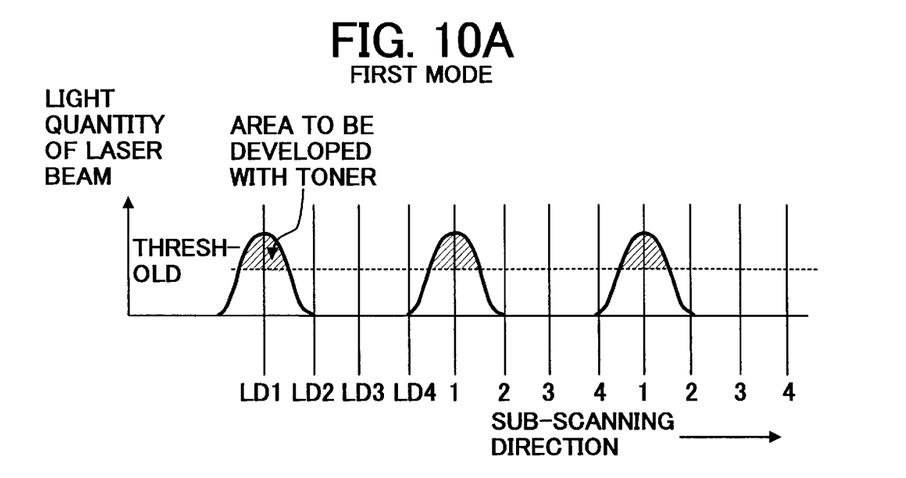
FIGS. 10A through 10H are schematic views explaining eight modes of writing a latent image of a reference image according to the another embodiment of the present invention.

The latent image writing device 4 has eight modes of writing the reference latent image. FIGS. 10A through 10H are schematic views of explaining the eight modes of writing the reference latent image. In the first mode, as illustrated in FIG. 10A, the latent image writing device 4 writes a first mode reference latent image by a laser beam emitted from a first laser diode (hereinafter simply referred to as LD1) of the four-channel LD array 40a (63) on the surface of the photoreceptor drum 6.

The first mode reference latent image formed by the laser beam emitted from LD1 is developed with toner into a first mode reference toner image. Subsequently, the photosensor 100 measures the density of the first mode reference toner image. Thereafter, the quantity of light of the laser beam emitted from LD1 is adjusted by the power modulation (PM) according to the density of the first mode reference toner image detected by the photosensor 100 such that the density of the first mode reference toner image becomes an adequate value. If necessary, the quantity of light of the laser beam emitted from LD1 may be adjusted according to the density of a plurality of first mode reference toner images.

Figure 10B:
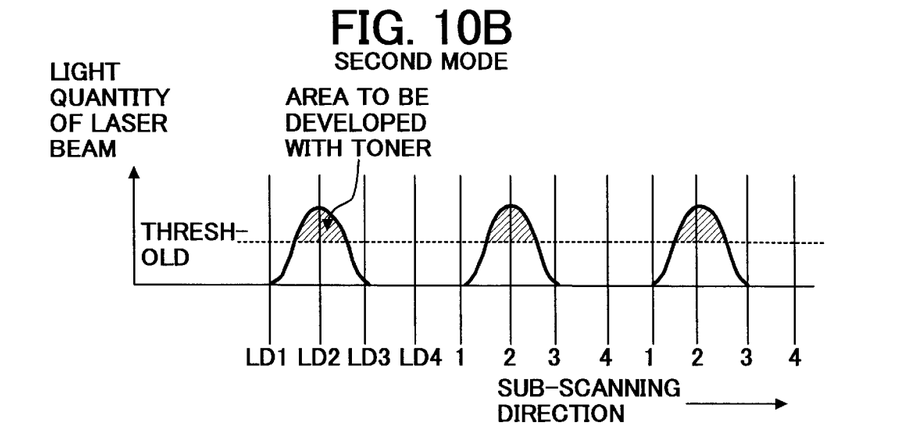

Next, in the second mode, as illustrated in FIG. 10B, the latent image writing device 4 writes a second mode reference latent image by a laser beam emitted from a second laser diode (hereinafter simply referred to as LD2) of the four-channel LD array 40a (63) on the surface of the photoreceptor drum 6. The second mode reference latent image formed by the laser beam emitted from LD2 is developed with toner into a second mode reference toner image.

Similarly as in the first mode, the photosensor 100 measures the density of the second mode reference toner image. Thereafter, the quantity of light of the laser beam emitted from LD2 is adjusted by the power modulation (PM) according to the density of the second mode reference toner image detected by the photosensor 100 such that the density of the second mode reference toner image becomes an adequate value.

Figure 10C:
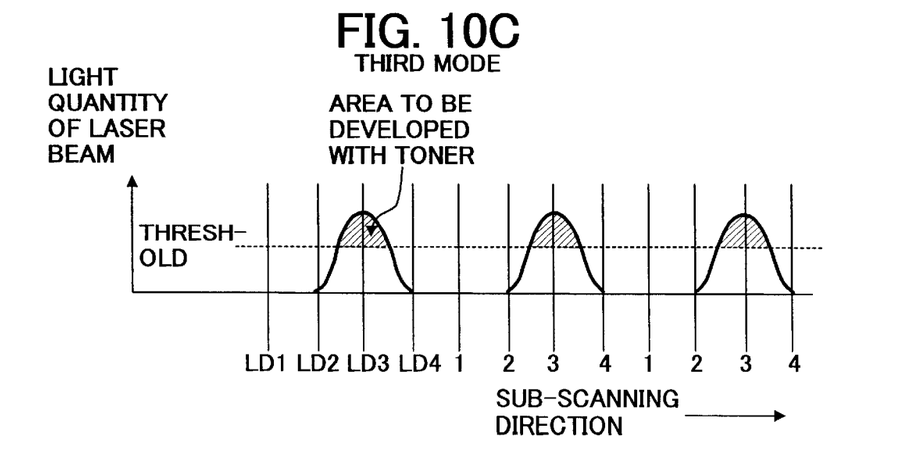

Next, in the third mode, as illustrated in FIG. 10C, the latent image writing device 4 writes a third mode reference latent image by a laser beam emitted from a third laser diode (hereinafter simply referred to as LD3) of the four-channel LD array 40a (63) on the surface of the photoreceptor drum 6. The third mode reference latent image formed by the laser beam emitted from LD4 is developed with toner into a third mode reference toner image.

Similarly as in the first and second modes, the photosensor 100 measures the density of the third mode reference toner image. Thereafter, the quantity of light of the laser beam emitted from LD3 is adjusted by the power modulation (PM) according to the density of the third mode reference toner image detected by the photosensor 100 such that the density of the third mode reference toner image becomes an adequate value.

Figure 10D:
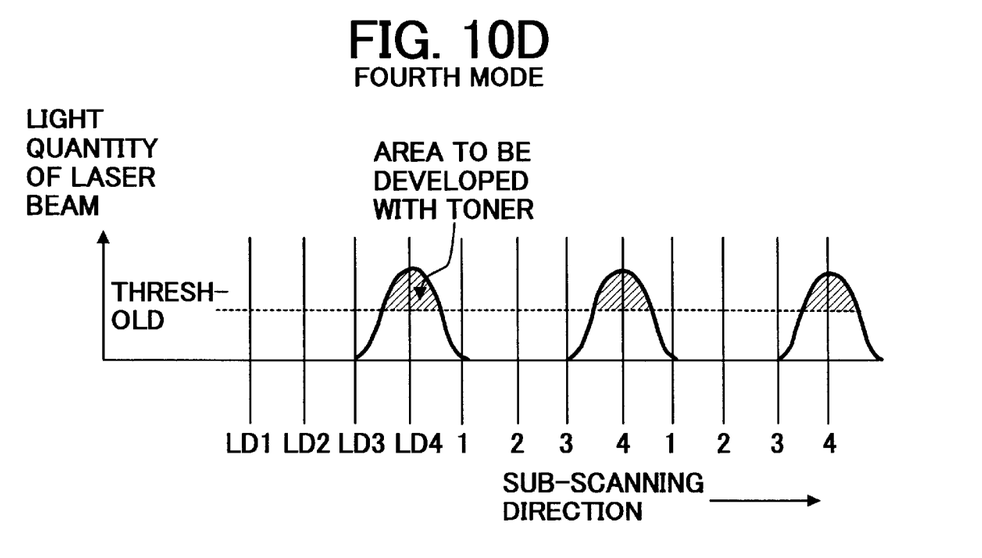

Next, in the fourth mode, as illustrated in FIG. 10D, the latent image writing device 4 writes a fourth mode reference latent image by a laser beam emitted from a fourth laser diode (hereinafter simply referred to as LD4) of the four-channel LD array 40a (63) on the surface of the photoreceptor drum 6. The fourth mode reference latent image formed by the laser beam emitted from LD4 is developed with toner into a fourth mode reference toner image.

Similarly as in the first through third modes, the photosensor 100 measures the density of the fourth mode reference toner image. Thereafter, the quantity of light of the laser beam emitted from LD4 is adjusted by the power modulation (PM) according to the density of the fourth mode reference toner image detected by the photosensor 100 such that the density of the fourth mode reference toner image becomes an adequate value. Thereby, the quantity of lights of laser beams emitted from LD1 through LD4 is well balanced.

Figure 10E:
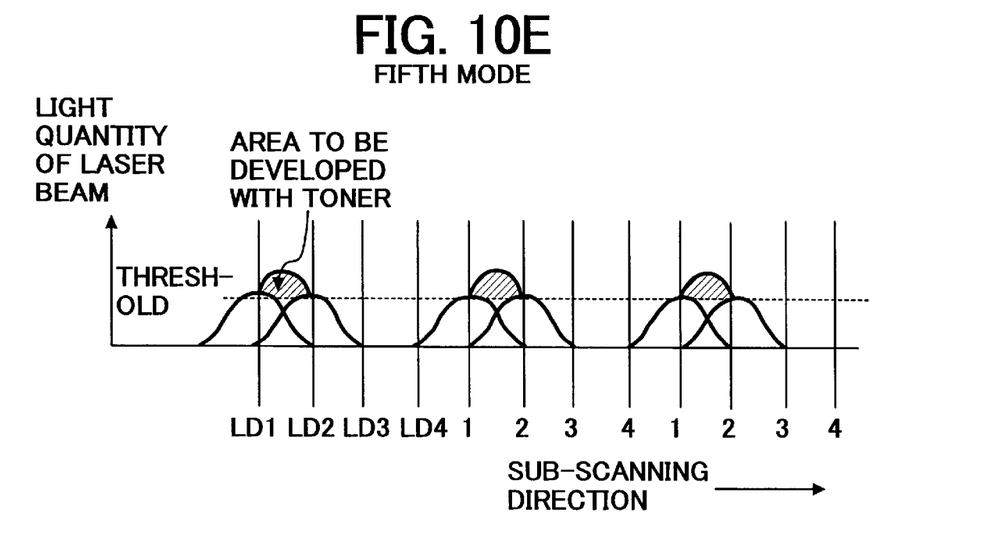
Figure 10F:
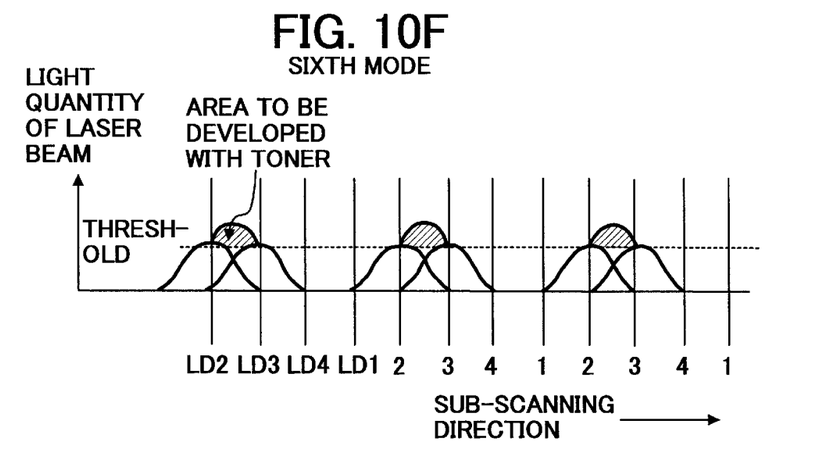
Figure 10G:
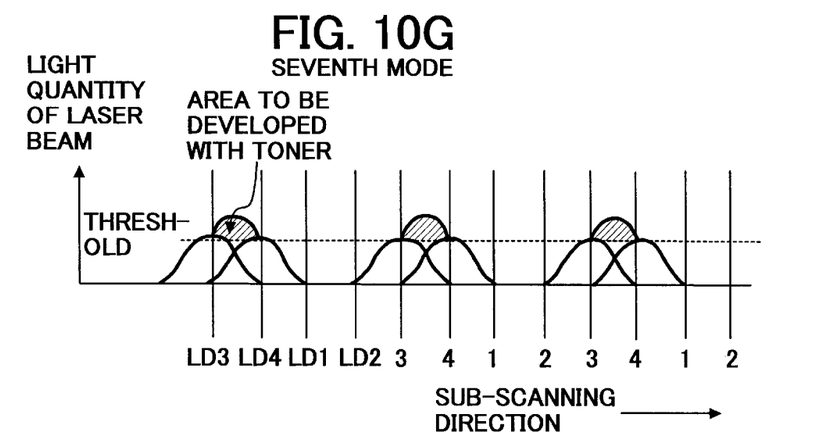

In the fifth through seventh modes, as illustrated in FIGS. 10E through 10G, respectively, the latent image writing device 4 writes further reference latent images by two adjacent partially overlapped laser beams emitted from any combination of LD1/LD2, LD2/LD3, and LD3/LD4 on the surface of the photoreceptor drum 6. The further reference latent images formed by the two adjacent partially overlapped laser beams emitted from any combination of LD1/LD2, LD2/LD3, and LD3/LD4 are developed with toner into respective further reference toner images.

In a similar way to the first through fourth modes, the quantity of light of the two adjacent partially overlapped laser beams emitted from any combination of LD1/LD2, LD2/LD3, and LD3/LD4 is adjusted by the power modulation (PM) according to the density of the respective further reference toner images detected by the photosensor 100 such that the densities of the respective further reference toner images become an adequate value. Thereby, the quantity of light of any one of the four laser beams emitted from LD1, LD2, LD3, and LD4, and the quantity of light of the two adjacent partially overlapped laser beams emitted from any combination of LD1/LD2, LD2/LD3, and LD3/LD4 are well balanced.

With the above-described adjustments of the laser beams in the first through seventh modes, precise images according to image data may be obtained in image formation even though the sensitivity and characteristics of the photoreceptor drum 6 change or the LD array 40a deteriorates due to the lapse of time and changes in environmental conditions.

Figure 10H:
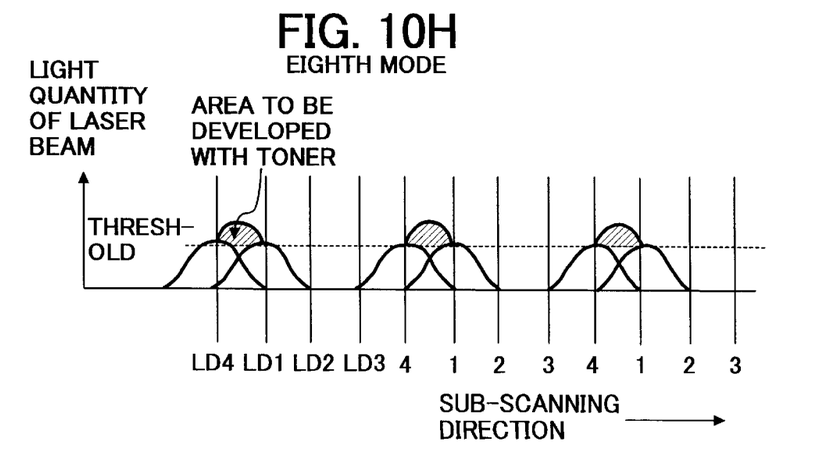
Figure 11:
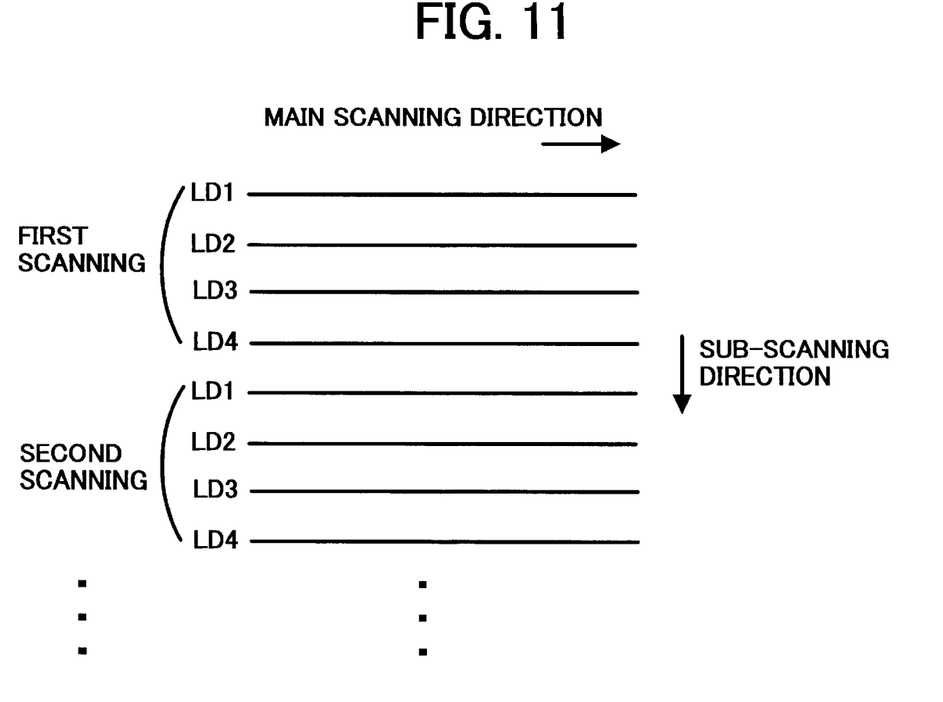
FIG. 11 is a schematic view explaining an eighth mode in which a reference latent image is formed by way of a laser beam emitted in a first scanning partially overlapped with a laser beam emitted in a second scanning.

With respect to a mode in which the latent image writing device 4 writes a reference latent image by two adjacent partially overlapped laser beams on the surface of the photoreceptor drum 6, as illustrated in FIG. 10H, an eighth mode reference latent image may be formed by a laser beam emitted from LD4 partially overlapped with a laser beam emitted from LD1 (i.e., the eighth mode). Specifically, referring to FIG. 11, an eighth mode reference latent image may be formed by a laser beam emitted from LD4 in the first scanning (i.e., scanning a most downstream position on the surface of the photoreceptor drum 6 in the sub-scanning direction in a previous scan in repeated scanning), partially overlapped with a laser beam emitted from LD1 in the second scan (i.e., scanning a most upstream position on the surface of the photoreceptor drum 6 in the sub-scanning direction in a subsequent scan in repeated scanning).

When comparing the adjusted value of the quantity of light of the laser beam in the first through fourth modes with that of the quantity of light of the laser beam in the fifth mode, a ratio between the adjusted value of the quantity of light of the laser beam in the first through fourth modes and that of the quantity of light of the laser beam in the fifth mode may be obtained. If the quantity of light of the laser beam in the sixth through eighth modes is adjusted by the above-described ratio, adjusting the quantity of light of the laser beam by writing the respective further reference latent images in the sixth through eighth modes is not necessarily required.

However, there may be a case in which a laser beam pitch changes. In order to form images with accuracy, it is preferable that the quantity of light of each laser beam is adjusted by performing the first through eighth modes.

In addition, if another reference toner image is formed by a broader or narrower laser beam, and a quantity of light of each laser beam is adjusted for image formation according to the density of the another reference toner image, an image may be formed more precisely.

In the above-described embodiments, the quantity of light of each laser beam is adjusted by the power modulation (PM) according to the density of the reference toner image detected by the photosensor 100. However, the quantity of light of each laser beam may be adjusted by the pulse width modulation (PWM).

Numerous additional modifications and variations of the present invention are possible in light of the above teachings. It is therefore to be understood that within the scope of the appended claims, the present invention may be practiced otherwise than as specifically described herein.

This document claims priority and contains subject matter related to Japanese Patent Application No. 2001-080713 filed in the Japanese Patent Office on Mar. 21, 2001, and the entire contents of each of which are hereby incorporated herein by reference.

What is claimed as new and is desired to be secured by Letters Patent of the United States is:

1. An image forming apparatus, comprising:
    an image bearing member;
    a latent image writing device configured to emit a plurality of laser beams, two adjacent of the plurality of laser beams partially overlapping in a sub-scanning direction, respectively, and forming a latent image of a reference image on a surface of the image bearing member by repeatedly scanning each laser beam forming the latent image of the reference image on the surface of the image bearing member, the latent image writing device having a plurality of modes of writing the latent image of the reference image;
    a developing device configured to develop the latent image of the reference image formed on the surface of the image bearing member with toner into a toner image of the reference image; and
    a detecting device configured to detect a density of the toner image of the reference image on the image bearing member,
    wherein a quantity of light of each laser beam forming a subsequent latent image is adjusted according to the density of the toner image of the reference image detected by the detecting device.

2. The image forming apparatus according to claim 1, wherein a number of the plurality of modes of writing the latent image of the reference image is at least greater than a number of the plurality of laser beams by one.

3. The image forming apparatus according to claim 1, wherein the modes of writing the latent image of the reference image include a first mode of writing the latent image of the reference image by any one of the plurality of laser beams, and a second mode of writing the latent image of the reference image by any of the two adjacent partially overlapped laser beams of the plurality of laser beams.

4. The image forming apparatus according to claim 1, wherein the plurality of laser beams include two laser beams, and wherein the modes of writing the latent image of the reference image include a first mode of writing the latent image of the reference image by any one of the two laser beams, and a second mode of writing the latent image of the reference image by the two laser beams, which are adjacent and partially overlapped.

5. The image forming apparatus according to claim 1, wherein the plurality of laser beams include four laser beams, and wherein the modes of writing the latent image of the reference image include a first mode of writing the latent image of the reference image by any one of the four laser beams, and a second mode of writing the latent image of the reference image by any two adjacent partially overlapped laser beams of the four laser beams.

6. The image forming apparatus according to claim 1, wherein the modes of writing the latent image of the reference image include a mode of writing the latent image of the reference image by a laser beam of the plurality of laser beams, scanning a most downstream position on the surface of the image bearing member in the sub-scanning direction in a previous scan in a repeated scanning operation, partially overlapped with a laser beam of the plurality of laser beams, and scanning a most upstream position on the surface of the image bearing member in the sub-scanning direction in a subsequent scan in the repeated scanning operation.

7. An image forming apparatus, comprising:
    means for bearing an image;
    means for emitting a plurality of laser beams, two adjacent of the plurality of laser beams partially overlapping in a sub-scanning direction, respectively, and forming a latent image of a reference image on a surface of the bearing means by repeatedly scanning each laser beam forming the latent image of the reference image on the surface of the bearing means, the emitting and forming means having a plurality of modes of writing the latent image of the reference image;
    means for developing the latent image of the reference image formed on the surface of the bearing means with toner into a toner image of the reference image; and
    means for detecting a density of the toner image of the reference image on the bearing means,
    wherein a quantity of light of each laser beam forming a subsequent latent image is adjusted according to the density of the toner image of the reference image detected by the means for detecting.

8. The image forming apparatus according to claim 7, wherein a number of the plurality of modes of writing the latent image of the reference image is at least greater than a number of the plurality of laser beams by one.

9. The image forming apparatus according to claim 7, wherein the modes of writing the latent image of the reference image include a first mode of writing the latent image of the reference image by any one of the plurality of laser beams, and a second mode of writing the latent image of the reference image by any of the two adjacent partially overlapped laser beams of the plurality of laser beams.

10. The image forming apparatus according to claim 7, wherein the plurality of laser beams include two laser beams, and wherein the modes of writing the latent image of the reference image include a first mode of writing the latent image of the reference image by any one of the two laser beams, and a second mode of writing the latent image of the reference image by the two laser beams, which are adjacent and partially overlapped.

11. The image forming apparatus according to claim 7, wherein the plurality of laser beams includes four laser beams, and wherein the modes of writing the latent image of the reference image include a first mode of writing the latent image of the reference image by any one of the four laser beams, and a second mode of writing the latent image of the reference image by any two adjacent partially overlapped laser beams of the four laser beams.

12. The image forming apparatus according to claim 7, wherein the modes of writing the latent image of the reference image include a mode of writing the latent image of the reference image by a laser beam of the plurality of laser beams, scanning a most downstream position on the surface of the bearing means in the sub-scanning direction in a previous scan in the step of repeated scanning, partially overlapped with a laser beam of the plurality of laser beams, and scanning a most upstream position on the surface of the bearing means in the sub-scanning direction in a subsequent scan in the step of repeated scanning.

* * * * *